United States Patent
Pinel et al.

(10) Patent No.: US 10,755,035 B2
(45) Date of Patent: Aug. 25, 2020

(54) DETERMINING LOGICAL BREAKS IN A DIGITAL TEXT

(71) Applicant: International Business Machines Corporation, Armonk, NY (US)

(72) Inventors: Florian Pinel, New York, NY (US); Donna K. Byron, Petersham, MA (US); Benjamin L. Johnson, Baltimore, MD (US); Carmine DiMascio, West Roxbury, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/028,883

(22) Filed: Jul. 6, 2018

(65) Prior Publication Data
US 2020/0012713 A1    Jan. 9, 2020

(51) Int. Cl.
*G06F 17/00*     (2019.01)
*G06F 40/166*    (2020.01)
*G06F 40/295*    (2020.01)

(52) U.S. Cl.
CPC .......... *G06F 40/166* (2020.01); *G06F 40/295* (2020.01)

(58) Field of Classification Search
CPC .............. G06F 15/0291; G06F 3/0483; G06K 9/00469
See application file for complete search history.

(56) References Cited

U.S. PATENT DOCUMENTS

| | | | |
|---|---|---|---|
| 7,783,644 B1 | 8/2010 | Petrou et al. | |
| 8,325,974 B1 | 12/2012 | Killalea et al. | |
| 8,352,876 B2 | 1/2013 | Batarseh et al. | |
| 9,535,884 B1 | 1/2017 | Chatterjee et al. | |
| 10,007,843 B1* | 6/2018 | Letourneur | G06K 9/00469 |
| 10,089,059 B1* | 10/2018 | Taneja | G06F 16/686 |
| 2012/0079372 A1* | 3/2012 | Kandekar | G06F 17/2745 715/256 |
| 2012/0206472 A1* | 8/2012 | Kandekar | G06Q 30/0214 345/581 |

(Continued)

FOREIGN PATENT DOCUMENTS

WO     2016122556 A1    8/2016

OTHER PUBLICATIONS

Ashbrook et al., "Learning Significant Locations and Predicting User Movement with GPS", Proceedings of the 6th International Symposium on Wearable Computers (ISWC'02), 0-7695-1816-08/02, © 2002 IEEE, 8 pages.

(Continued)

*Primary Examiner* — Scott T Baderman
*Assistant Examiner* — Barbara M Level
(74) *Attorney, Agent, or Firm* — Stephanie L. Carusillo (57) ABSTRACT

In an approach to determining one or more logical breaks in a digital text, a computer determines a reading speed of a user for a current reading session of a digital text and an available time for the current reading session for the user. The computer then determines, based, at least in part, on the reading speed and the available time, a user range in the digital text for the current reading session, and then one or more possible logical breaks within the user range. The computer further determines a first logical break, based on the determined user range, of the one or more possible logical breaks for the current reading session.

18 Claims, 6 Drawing Sheets

(56) References Cited

U.S. PATENT DOCUMENTS

| | | | |
|---|---|---|---|
| 2012/0210203 A1* | 8/2012 | Kandekar | G06F 17/241 715/230 |
| 2013/0080471 A1 | 3/2013 | Forte et al. | |
| 2013/0080881 A1* | 3/2013 | Goodspeed | G06F 3/04847 715/251 |
| 2013/0311870 A1* | 11/2013 | Worsley | G06F 17/217 715/234 |
| 2015/0339015 A1* | 11/2015 | Wu | G06F 3/0482 715/776 |

OTHER PUBLICATIONS

Hearst, Marti A., "TextTiling: Segmenting Text into Multi-paragraph Subtopic Passages", Xerox PARC, Computational Linguistics, vol. 23, No. 1, © 1997 Association for Computational Linguistics, pp. 33- 64.

Jones, Karen Sparck, "Automatic summarising: the state of the art", Computer Laboratory, University of Cambridge, This paper in its final form will appear in Information Processing and Management, Special Issue on Automatic Summarising, 2007, 52 pages.

Kehagais et al., "Linear Text Segmentation using a Dynamic Programming Algorithm", Proceedings of the tenth conference on European chapter of the Association for Computational Linguistics—vol. 1, Budapest, Hungary, Apr. 12-17, 2003, EACL '03, pp. 171-178.

Kupiec et al., "A Trainable Document Summarizer", Proceedings of the 18th annual international ACM SIGIR conference on Research and development in information retrieval, SIGIR '95, Seattle, Washington, USA, Jul. 9-13, 1995, pp. 68-73.

Mell et al., "The NIST Definition of Cloud Computing", Recommendations of the National Institute of Standards and Technology, Special Publication 800-145, Sep. 2011, 7 pages.

"Lexical density", Wikipedia, This page was last edited on Jan. 13, 2018, 1 page, <https://en.wikipedia.org/wiki/Lexical_density>.

\* cited by examiner

DETERMINING LOGICAL BREAKS IN A DIGITAL TEXT

BACKGROUND

The present invention relates generally to the field of data processing, and more particularly to specific processing of a digital text document in order to improve a user experience.

A chapter in a book is a main division, indicating where an author has chosen to separate one section of a story from another. Those reading the book may use chapters as a logical break in order to pace his or her reading. However, the author's choice in where to place a chapter break may not always align with the time available that one has for a particular session of reading. With the culture shift from printed to digital material, and the increase in the use of e-readers and the availability of electronic books ("e-books"), people are reading more frequently, and in more locations.

SUMMARY

Embodiments of the present invention disclose a method, a computer program product, and a computer system for determining logical breaks in a digital text. The method includes determining, by one or more computer processors, a reading speed of a user for a current reading session of a digital text, and an available time for the current reading session for the user. The method further includes determining, by the one or more computer processors, based, at least in part, on the reading speed and the available time, a user range in the digital text for the current reading session, and then determining, by the one or more computer processors, one or more possible logical breaks within the user range. The method then determines, by the one or more computer processors, based on the determined user range, a first logical break of the one or more possible logical breaks for the current reading session.

DETAILED DESCRIPTION

Due to the increased popularity of e-books and other digital texts, and the corresponding increase in where and when users read, there is a need for identification of more frequent logical breaks in many e-books and other digital text documents. Embodiments of the present invention recognize that, based on a reading speed of a user, and available time to read, the user may not be able to read to a predetermined break in a digital text, for example, a chapter, section, or unit. Embodiments of the present invention recognize that there is a need for more frequent logical breaks in a digital text, so if a user needs to stop reading due to an unavailability of time or other interruption, the user will not need to re-read material in the text, for example, in order to refresh plot points or character introductions. Embodiments of the present invention recognize that one or more possible logical breaks may be determined when an entity, e.g., a character, location or plot point, is introduced or removed from the timeline of the digital text. Embodiments of the present invention recognize that although a possible logical break is identified, the digital text may need to be modified in order for the user to reach the identified logical break.

Figure 1:
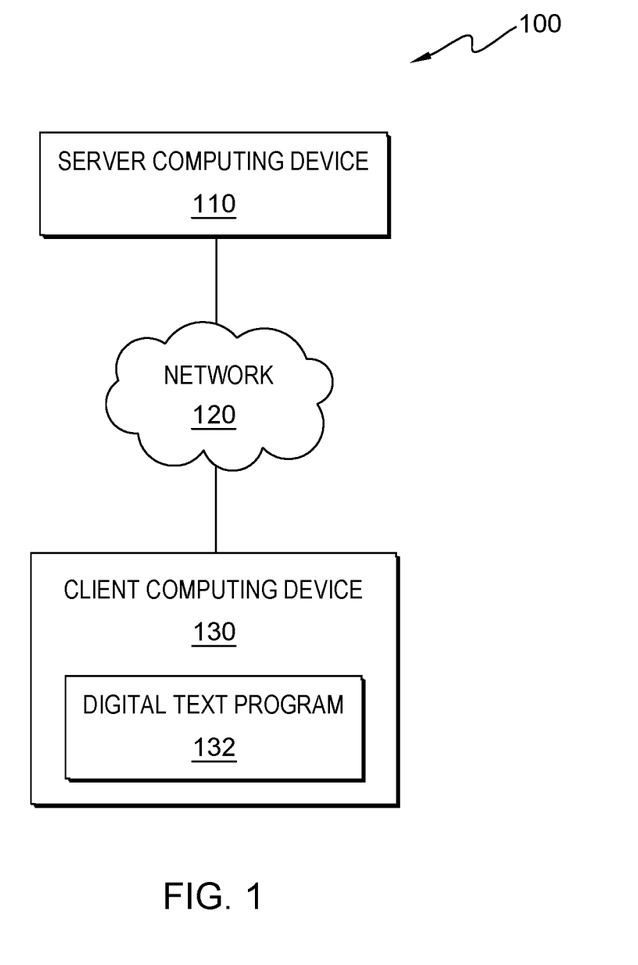
FIG. 1 is a functional block diagram illustrating a data processing environment, in accordance with an embodiment of the present invention.

The present invention will now be described in detail with reference to the Figures. FIG. 1 is a functional block diagram illustrating a data processing environment, generally designated 100, in accordance with one embodiment of the present invention. In an embodiment, data processing environment 100 may be a distributed data processing environment. The term "distributed" can describe a computer system that includes multiple, physically distinct devices that operate together as a single computer system. FIG. 1 provides only an illustration of one implementation and does not imply any limitations with regard to the environments in which different embodiments may be made by those skilled in the art without departing from the scope of the invention as recited by the claims.

Data processing environment 100 includes server computing device 110 and client computing device 130, interconnected via network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between server computing device 110, client computing device 130, and other computing devices (not shown) within data processing environment 100.

Server computing device 110 can be a standalone computing device, a management server, a web server, a mobile computing device, or any other electronic device or computing system capable of receiving, sending, and processing data. In other embodiments, server computing device 110 can represent a server computing system utilizing multiple computers as a server system, such as in a cloud computing environment. In another embodiment, server computing device 110 can be a laptop computer, a tablet computer, a netbook computer, a personal computer (PC), a desktop computer, a personal digital assistant (PDA), a smart phone, or any programmable electronic device capable of communicating with client computing device 130 and other computing devices (not shown) within data processing environment 100 via network 120. In another embodiment, server computing device 110 represents a computing system utilizing clustered computers and components (e.g., database server computers, application server computers, etc.) that act as a single pool of seamless resources when accessed within data processing environment 100. In various embodiments of the present invention, server computing device 110 stores digital texts, including documents, e-books, e-magazines, and the like and is capable of providing these digital texts to client computing device 130 for use by a user of device 130. Server computing device 110 may include internal and external hardware components, as depicted and described in further detail with respect to FIG. 4.

In various embodiments of the present invention, client computing device 130 can be one of a desktop computer, a laptop computer, a tablet computer, a smart phone, or any programmable electronic device capable of communicating with various components and devices within data processing environment 100, via network 120. In general, client computing device 130 represents any programmable electronic device or combination of programmable electronic devices capable of executing machine readable program instructions and communicating with other computing devices (not shown) within data processing environment 100 via a network, such as network 120. In embodiments of the present invention, client computing device 130 is an e-reader, i.e., a mobile electronic device primarily designed for the purpose of reading digital e-books, and other digital text or documents. Client computing device 130 can be any electronic device that provides a user operating client computing device 130 with the ability to read an e-book displayed on a screen of the client computing device 130. In some embodiments, a screen of client computing device 130 is incorporated with the device 130. In other embodiments, a display screen can be separate from the client computing device 130, connected with a network, such as network 120, or computing cables. Client computing device 130 includes digital text program 132. In various embodiments, digital text program 132 may reside on server computing device 110 in data processing environment 100, and accessible by client computing device 130 via network 120. Client computing device 130 may include internal and external hardware components, as depicted and described in further detail with respect to FIG. 4.

Digital text program 132 may be a mobile application software program, or a "mobile app" or an "app", designed to run on a smart phone, a tablet computer, or other mobile devices. Digital text program 132 may operate within a web browser, or other compatible software used for reading digital text displayed via client computing device 130. Digital text program 132 may be any native application or pre-installed software on a mobile computing device, such as client computing device 130. A native application can be, for example, a web browser, email client, mapping program, or an app for purchasing music, other media, or additional apps. Digital text program 132 may be a software application or a web application that can run in a mobile web browser. Digital text program 132 may be any software used by the user of client computing device 130 to allow the user to read digital texts, such as e-books, e-magazines, manuals, etc. In an embodiment, digital text program 132 may be any app purchased by the user of client computing device 130 used to read digital texts. Although depicted in FIG. 1 as one instance, one of skill in the art will understand that there may be one or more instances of digital text program 132 on client computing device 130. In various embodiments of the present invention, digital text program 132 dynamically determines one or more logical breaks in a digital text. Digital text program 132 determines a reading speed of a user, and the user's available time, in order to determine a range for the user in the digital text. Based on the user range, and a created timeline for the digital text, digital text program 132 determines one or more possible logical breaks in the digital text at which the user may stop reading.

Figure 2:
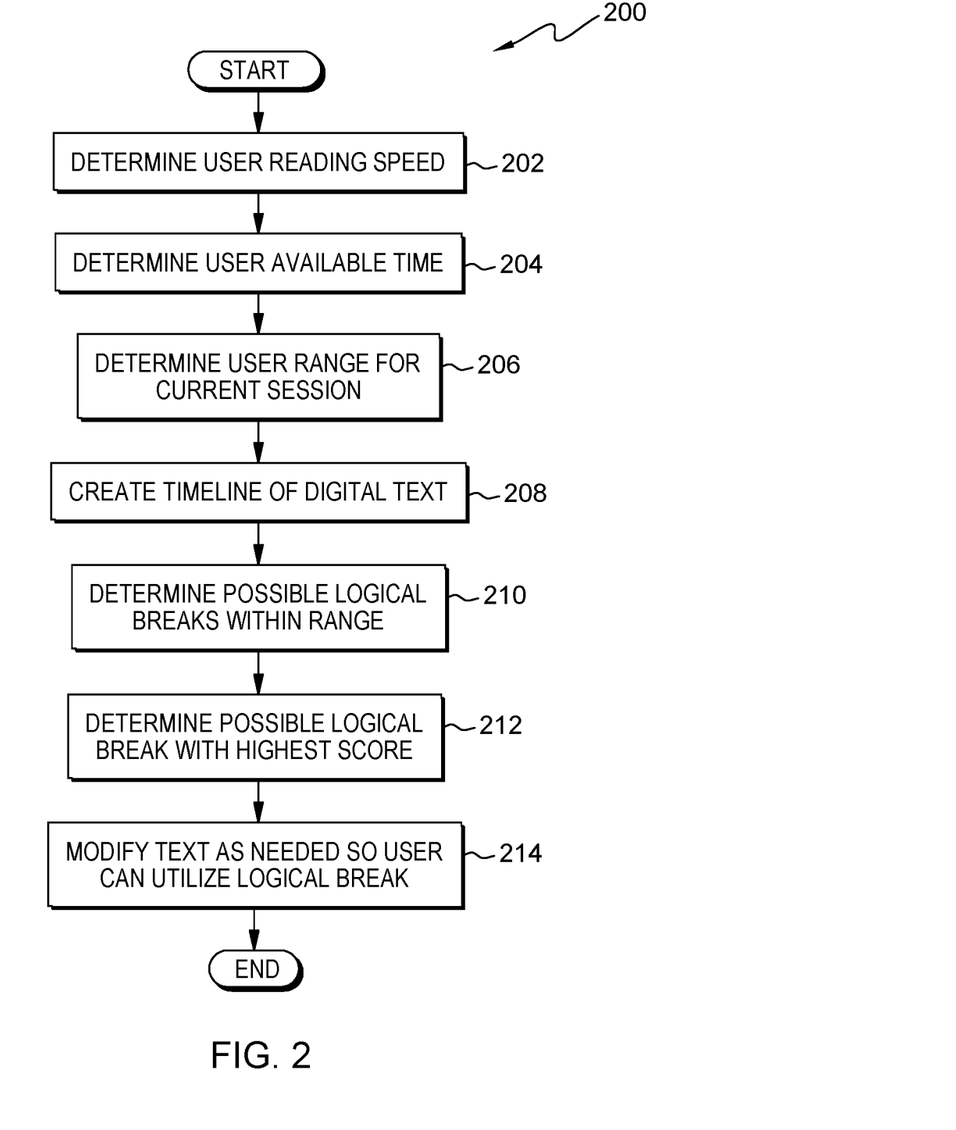
FIG. 2 is a flowchart depicting operational steps of a digital text program, for modifying a digital text based on dynamically determined logical breaks in the digital text, in accordance with an embodiment of the present invention.

FIG. 2 is a flowchart 200 depicting operational steps of digital text program 132 for dynamically determining logical breaks in a digital text based on user information, and modifying the digital text as needed for the user to meet one of the determined logical breaks, in accordance with an embodiment of the present invention.

Digital text program 132 determines a user reading speed (202). Digital text program 132, residing on client computing device 130 as depicted in FIG. 1, determines the user reading speed for the digital text being read based on, for example, words per page and time between page turns. As discussed above, the digital text may be an e-book, e-magazine, play, script, or other digital text document capable of being read on a computing device or e-reader. In various embodiments of the present invention, one or more additional parameters that may impact the user reading speed may be taken into consideration, for example, user location, time of day, type of book, subject matter (e.g., fiction novel, technical manual), user activity (e.g., walking, motionless, riding in a vehicle), and lexical density of the digital text. In an embodiment, digital text program 132 determines a user reading speed based on the a previous history of the user when reading a type of digital text similar to the current digital text being read. For example, a user may read an engineering textbook at a different speed than when reading a magazine article about an athlete's career.

Digital text program 132 determines the user available time (204). In various embodiments, digital text program 132 determines the user available time for reading by accessing a calendar of the user, which may indicate meetings and other scheduled events. In some embodiments, if the user is moving, digital text program 132 determines the user's available time by determining where the user is going and what form of transportation is being utilized, using methods known in the art. In various other embodiments, digital text program 132 determines the user's available time for reading based on user input, for example, a user may input at the start how much time is available for the current reading session, or a user may input at any time during the reading session how much time remains before the reading session needs to end. In still other embodiments, digital text program 132 learns a user's reading habits and factors in the user's location, time of day, and time of year to determine the user's available time.

Digital text program 132 determines the user's range for the current reading session (206). A user's range is a location in the digital text where the user must stop reading for the current reading session, determined based on the user's available time and reading speed. Digital text program 132 then extracts text, using the determined range, from around the determined location where the user must stop reading.

Digital text program 132 creates a timeline of the digital text (208). In various embodiments, digital text program 132 creates the timeline of various entities, including characters, locations, plot points, time indications, and importance of each entity, including each character, location or plot point. Digital text program 132 creates the timeline for the entire digital text, or for a section of the digital text, and can create the timeline in advance or at the time of the current reading session. In an embodiment where digital text program 132 creates the timeline in advance, digital text program 132 can store the timeline on client computing device 130, or on server computing device 110, accessible via network 120. In some embodiments, digital text program 132 utilizes natural language processing (NLP) or other known technologies, to extract a synopsis of the various entities in the digital text.

Figure 3:
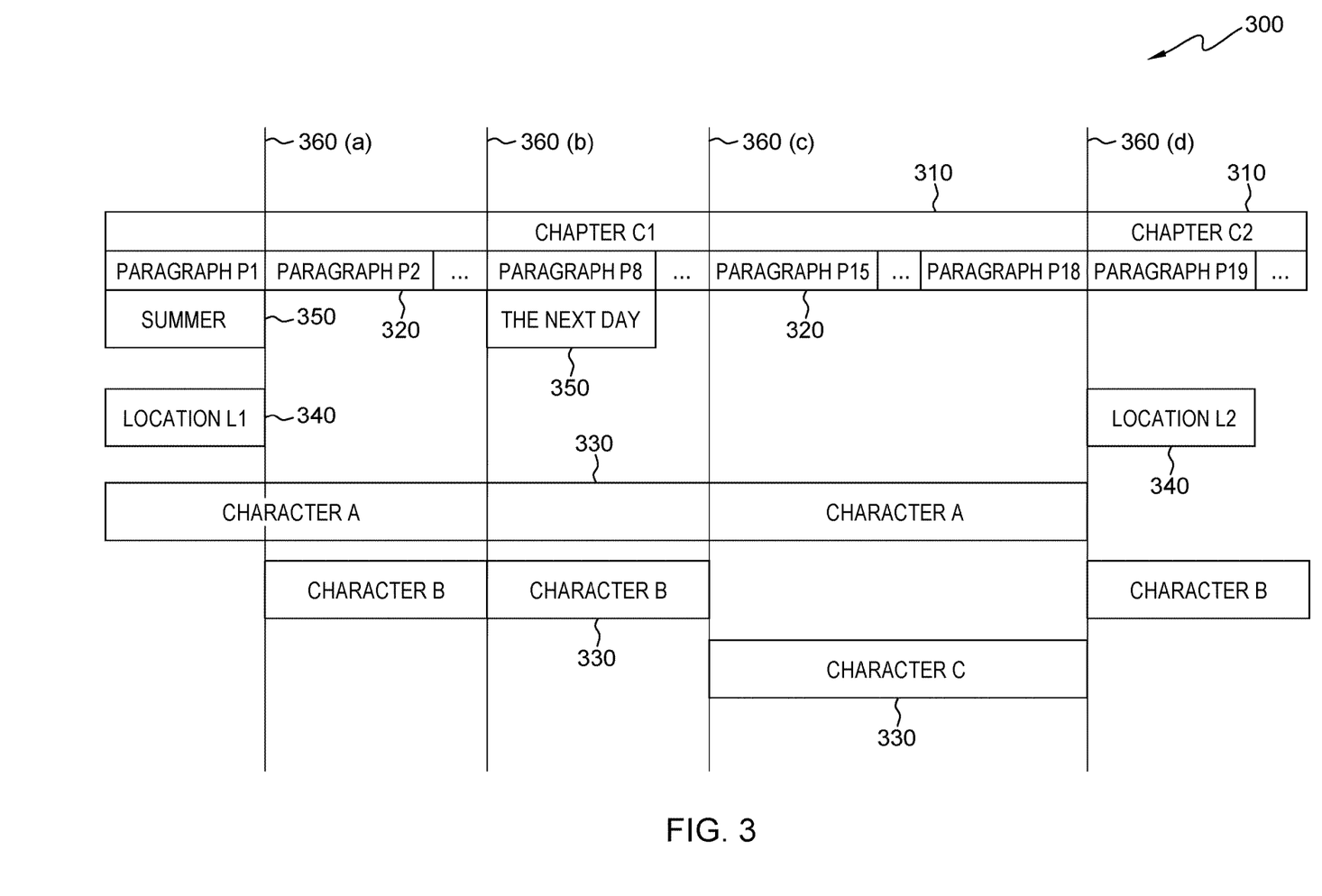
FIG. 3 is an example of a timeline created by the digital text program of FIG. 2, in accordance with an embodiment of the present invention.

FIG. 3 depicts an example timeline 300 created by digital text program 132. Chapters 310, as indicated within the digital text, are depicted across the horizontal axis. Depicted below these are paragraphs 320. Each entity determined in the digital text, for example, each character 330, location 340, or time 350, is listed under the respective paragraph 320 in which the entity is mentioned. In various embodiments of the present invention, one or more entities may span across more than one paragraph, instead of being represented as a point under each paragraph. For location and time entities, digital text program 132 determines an entity applies to the digital text until it is replaced by a new entity of a same type. For example, when one or more characters enter a room, digital text program 132 determines the one or more characters stay in the room until another entity of the same type is introduced, or the text indicates at least one character goes to another location. Additionally, digital text program 132 can use ontologies of location and time expressions to determine the relationship between one or more entities, which can impact the span of the one or more entities in the digital text. For example, when a character enters a house, and then the digital text indicates the character goes in to the kitchen, digital text program 132 determines the character is still in the house because the kitchen is part of the house.

In other embodiments, one or more entities appearing in the text are not added to the timeline, or removed from the timeline, if the importance of the entity is below a predetermined threshold. In an embodiment, digital text program 132 determines an importance of an entity by counting the number of phrases in which the entity appears in a section of the digital text, or the entire digital text. For example, digital text program 132 uses anaphora resolution (i.e., pronoun resolution) for character entities and counts the number of phrases in which the character's name or anaphora appears. In another embodiment, digital text program 132 determines an importance of an entity, particularly the importance of a character, based on whether the entity appears in different sections of the digital text. In an embodiment, in utilizing the predetermined threshold for an importance of an entity, digital text program 132 may keep only the top N most important entities. If using only the top N results in too few acceptable logical breaks for the user (i.e., no logical breaks determined for the user's range), digital text program 132 repeats the process of determining the most important entities with a greater value for N.

Digital text program 132 determines one or more possible logical breaks within the user's range (210). Based on the timeline created, the user's determined range and the extracted text from around the determined location, digital text program 132 dynamically determines one or more locations in the digital text where an entity is introduced or removed, and identifies each of the one or more locations as a possible logical break, or stopping point, in the digital text. In embodiments of the present invention, the one or more possible logical breaks may replace existing chapters or sections, or be inserted between existing chapter stops. In FIG. 3, the determined possible logical breaks are depicted as 360(a)-(d). For example, possible logical break 360(c) occurs when character B is removed from the text and character C is introduced. Character B's removal occurs near the middle of chapter C1, and therefore is not at a chapter end, but digital text program 132 determines this as a logical break.

Digital text program 132 determines the possible logical break with the highest score (212). Digital text program 132 scores each of the one or more possible logical breaks based on one or more of the following criteria: importance of the one or more entities being introduced or removed, distance between the one or more entities introduced or removed (i.e., with characters, the distance is the number of paragraphs in which the characters do not appear together), location of the logical break within the range, heuristics such as prominence, topic detection, number and frequency of entities introduced or removed. In an embodiment, using a number of the one or more entities removed or introduced and the importance of each, digital text program 132 determines a score for each logical break. For example, in a book containing 1000 sentences, and referring to FIG. 3, character A appears in 100 sentences, and her importance score is (100/1000=0.1); characters B and C each appear in 50 sentences, and their importance scores are (50/1000=0.05). The entire book takes place during the summer, so "summer's" importance is (1); 100 phrases include "the next day", so "the next day's" importance is (100/1000=0.1). For location, 700 sentences take place in location L1 (importance 0.7), and 300 sentences take place in location L2 (importance 0.3). Referring to FIG. 3, at break 360(a) there is no change in location, and character B is introduced. The score of break 360(a) is then 0.05. Break 360(b) deals with only a change in time (i.e., the next day), so the score of break 360(b) is 0.1. At break 360(c), character B is removed and character C is introduced, so the score of break 360(c) is 0.05+0.05=1. For break 360(d), character B is introduced, characters A and C are removed, and the location changes, so the score of break 360(d) is 0.05+1.0+0.05+0.3=0.5. Digital text program 132 ranks the one or more possible logical breaks within the user's range based on the determined scores, and determines the possible logical break with the highest score. Therefore, in the preceding example break 360(d) has the highest score and is determined as the possible logical break with the highest score. It should be noted that in other embodiments, the score determination can be more complex.

Digital text program 132, based on the possible logical break with the highest score, modifies the digital text as needed so the user can utilize the logical break (214). In various embodiments, digital text program 132 does not need to modify the text, based on the user's reading speed and the determined logical break. Digital text program 132 determines the possible logical break with the highest score, and based on the location of the possible logical break in the user's range, modifies the digital text leading up to the possible logical break. For example, digital text program 132 speeds up or slows down the presentation speed of the digital text so the amount of text fits within the user's available time, or digital text program 132 otherwise alters the formatting of the text. In an embodiment, digital text program 132 may utilize speeding up or slowing down the presentation speed of an audio text being consumed by the user, or for example, with electronic readers displaying only one word, or a few words, at a time. In another embodiment, as the user's available time approaches an end, the possible logical break may not yet have been reached. In the event this occurs, and there is no other possible logical break prior to the determined logical break, digital text program 132 condenses the text, or a portion of the text, to fit within the time available. Digital text program 132 may condense the text by, for example, summarizing the remaining text prior to the logical break, or removing paragraphs determined not to be important (i.e., importance determined as whether an entity is introduced or removed in a particular paragraph).

In an embodiment, digital text program 132 may need to revise the identified possible logical break. For example, digital text program 132 may determine a first available time, and proceed to identify a first logical break with a highest score for the current reading session. If the user is interrupted, or the user determines more time is available for the current reading session, or if the user identifies another activity needing attention, the user may input a second available time. In another example, the user reading speed could change throughout the reading of a digital text, based on the text content for example, and the user range may change accordingly. In an embodiment, digital text program 132 can identify a second available time based on access to the user's calendar, i.e., a meeting is canceled. Digital text program 132 then determines a second logical break, based on the second available time, and modifies the text as needed in order to allow the user to reach the second logical break.

Embodiments of the present invention may offer various computing advantages, including dynamically determining logical breaks in a digital text, for example, an e-book. Embodiments of the present invention create a timeline of a digital text, and utilize the created timeline to determine one or more logical breaks. Embodiments of the present invention add an additional element that is not well-understood, routine or conventional at least by determining an importance of each of one or more entities in the timeline of the digital text, and based on the importance of each of the one or more entities, ranking one or more determined logical breaks in order to determine a best possible logical break for the user. Embodiments of the present invention further add an additional element that is not well-understood, routine or conventional at least by modifying the digital text prior to a determined logical break, so that the digital text prior to the determined logical break can be consumed by a user within a time the user has available.

Figure 4:
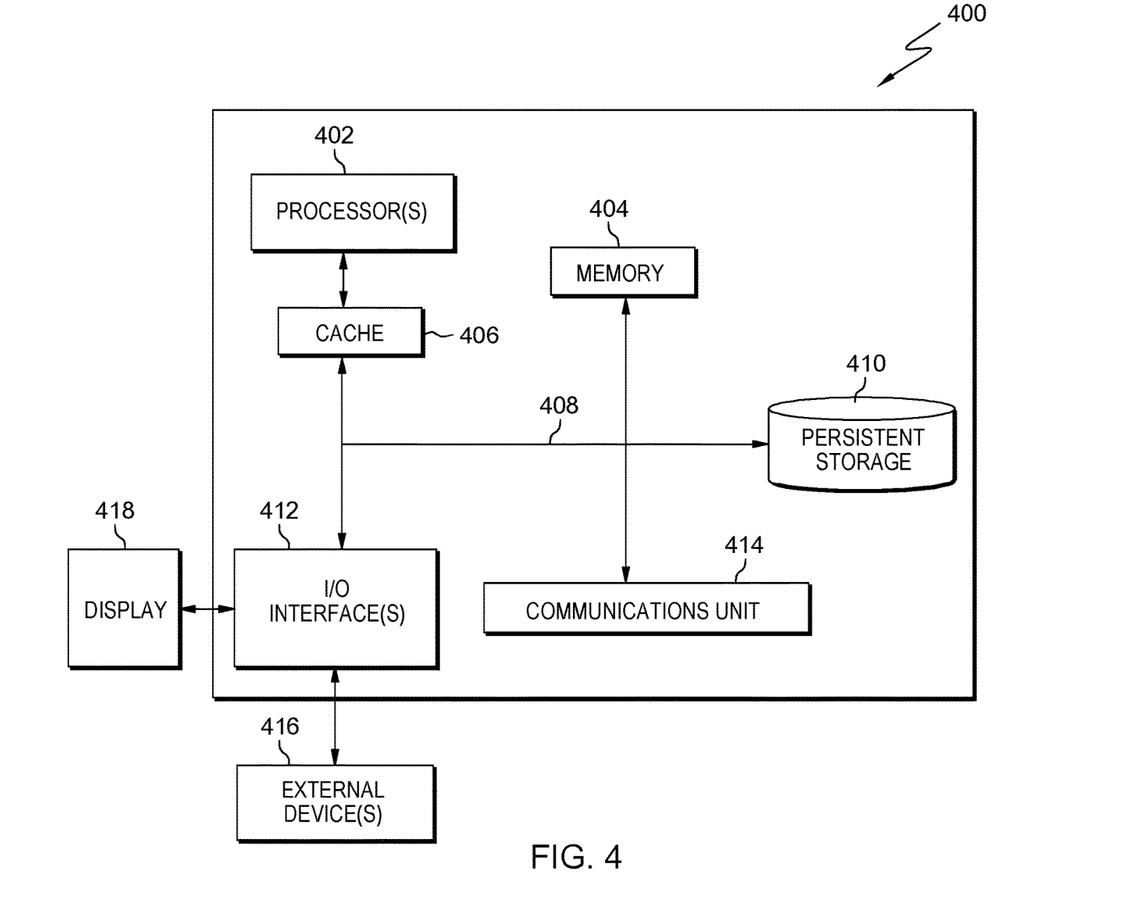
FIG. 4 is a block diagram of components of a data processing system, such as the client computing device of FIG. 1, in accordance with an embodiment of the present invention.

FIG. 4 depicts a block diagram 400 of components of server computing device 110 or client computing device 130 within data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server computing device 110 or client computing device 130 can include processor(s) 402, memory 404, cache 406, persistent storage 410, input/output (I/O) interface(s) 412, communications unit 414, and communications fabric 408. Communications fabric 408 provides communications between memory 404, cache 406, persistent storage 410, communications unit 414, and input/output (I/O) interface(s) 412. Communications fabric 408 can be implemented with any architecture designed for passing data and/or control information between processors (such as microprocessors, communications and network processors, etc.), system memory, peripheral devices, and any other hardware components within a system. For example, communications fabric 408 can be implemented with one or more buses.

Memory 404 and persistent storage 410 are computer readable storage media. In this embodiment, memory 404 includes random access memory (RAM). In general, memory 404 can include any suitable volatile or non-volatile computer readable storage media. Cache 406 is a fast memory that enhances the performance of processor(s) 402 by holding recently accessed data, and data near recently accessed data, from memory 404.

Program instructions and data used to practice embodiments of the present invention, such as digital text program 132, can be stored in persistent storage 410 for execution and/or access by one or more of the respective processor(s) 402 of client computing device 130 via cache 406. In this embodiment, persistent storage 410 includes a magnetic hard disk drive. Alternatively, or in addition to a magnetic hard disk drive, persistent storage 410 can include a solid-state hard drive, a semiconductor storage device, a read-only memory (ROM), an erasable programmable read-only memory (EPROM), a flash memory, or any other computer readable storage media or device that is capable of storing program instructions or digital information.

The media used by persistent storage 410 may also be removable. For example, a removable hard drive may be used for persistent storage 410. Other examples include optical and magnetic disks, thumb drives, and smart cards that are inserted into a drive for transfer onto another computer readable storage medium that is also part of persistent storage 410.

Communications unit 414, in these examples, provides for communications with other data processing systems or devices, including resources of server computing device 110 or client computing device 130. In these examples, communications unit 414 includes one or more network interface cards. Communications unit 414 may provide communications through the use of either or both physical and wireless communications links. Software and data used to practice embodiments of the present invention, for example, digital text program 132, may be downloaded to persistent storage 410 through communications unit 414.

I/O interface(s) 412 allows for input and output of data with other devices that may be connected to server computing device 110 or client computing device 130. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention can be stored on such portable computer readable storage media and can be loaded onto persistent storage 410 via I/O interface(s) 412. I/O interface(s) 412 also connect to a display 418.

Display 418 provides a mechanism to display data to a user and may be, for example, a computer monitor or an incorporated display screen, such as is used, for example, in tablet computers and smart phones.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
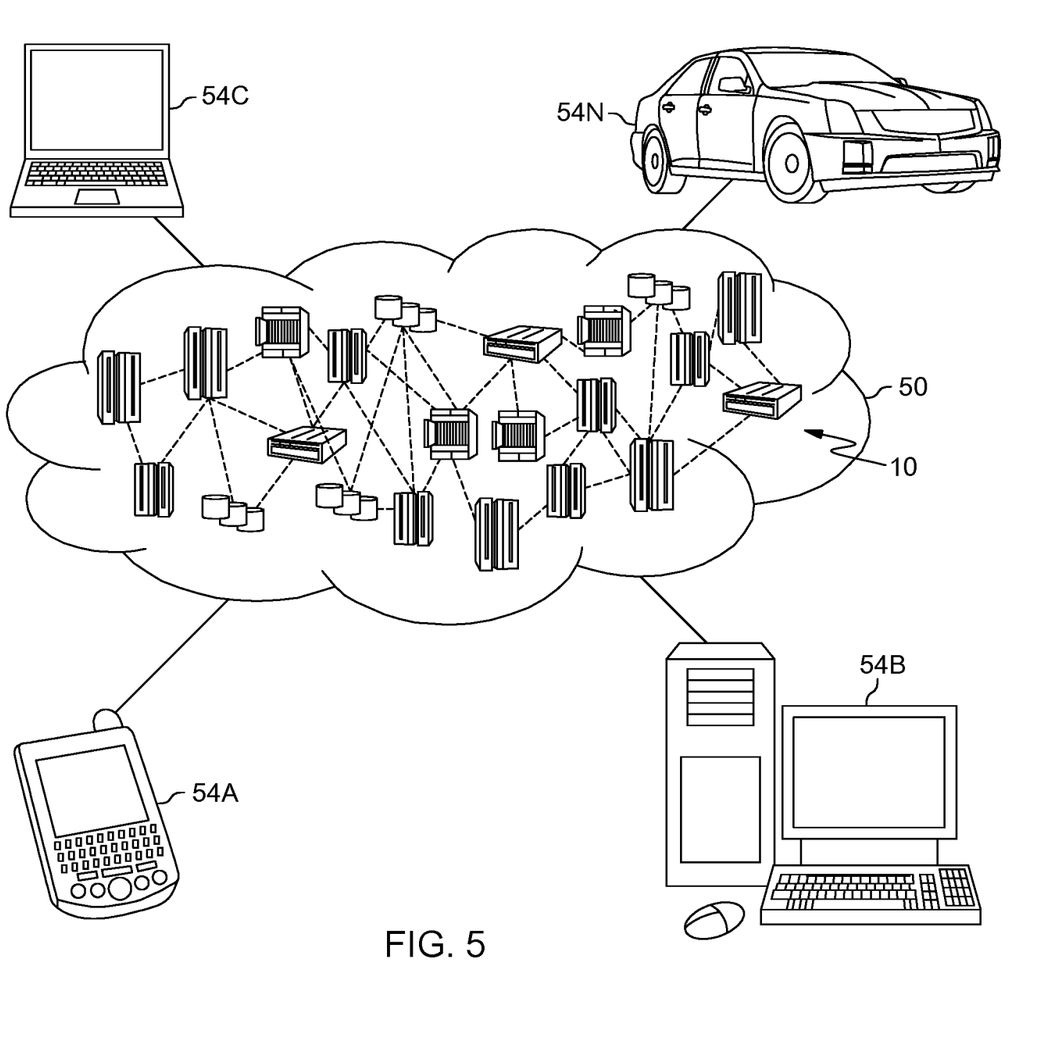
FIG. 5 depicts a cloud computing environment, in accordance with an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 10 and cloud computing environment 50 can communicate with any type of computerized device over any type of network and/or network addressable connection (e.g., using a web browser). In various embodiments, cloud computing node 10 is a computer system including components and capabilities as discussed with respect to FIG. 4.

Figure 6:
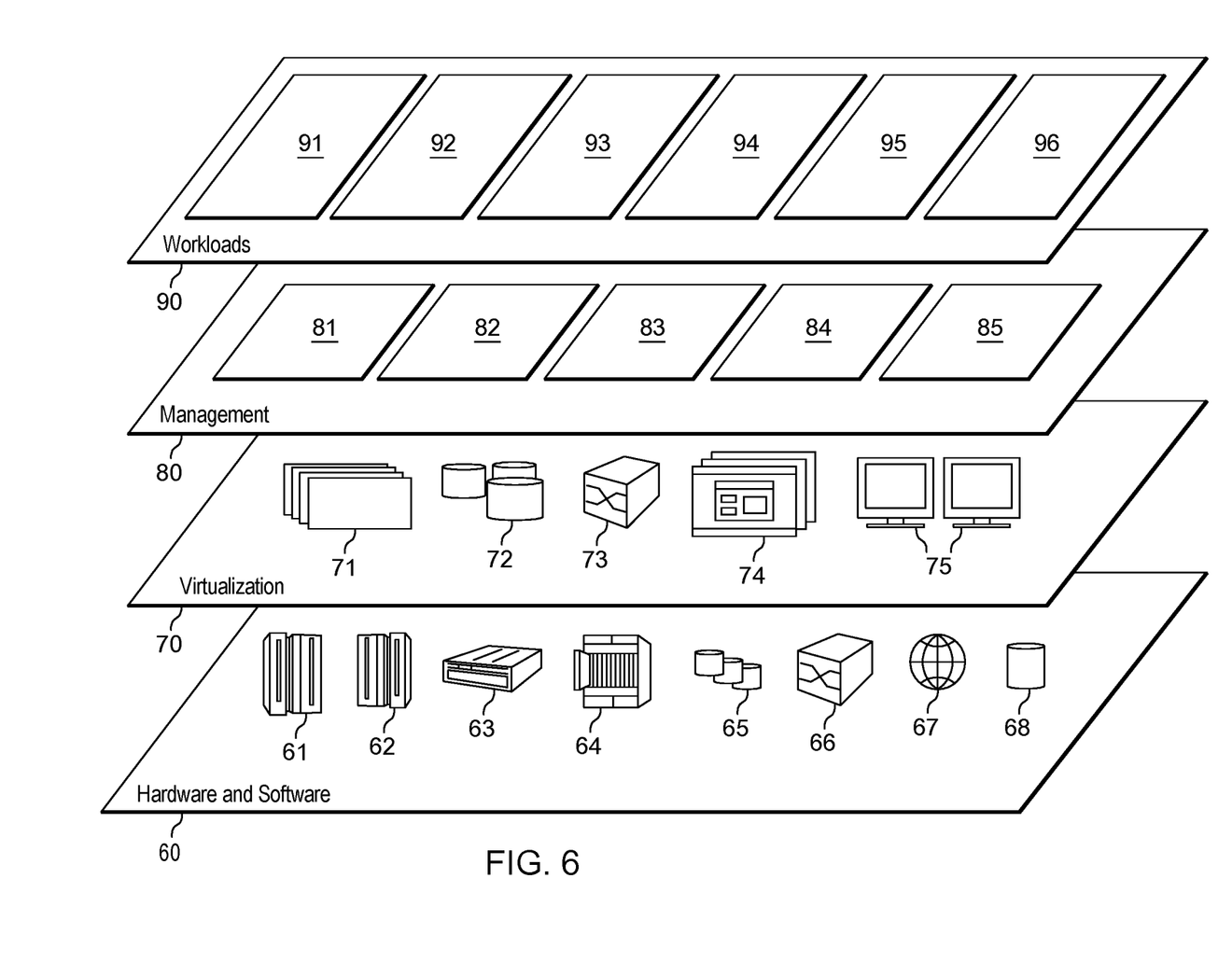
FIG. 6 depicts abstraction model layers, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and digital text program 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for determining one or more logical breaks in a digital text, the method comprising:
   determining, by one or more computer processors, a reading speed of a user for a current reading session of a digital text;
   determining, by the one or more computer processors, an available time for the current reading session for the user;
   determining, by the one or more computer processors, based, at least in part, on the reading speed and the available time, a user range in the digital text for the current reading session;
   determining, by the one or more computer processors, one or more possible logical breaks within the user range based on a timeline of the digital text, wherein the timeline includes an importance of one or more entities being introduced or removed;
   determining, by the one or more computer processors, a score for each of the one or more possible logical breaks, wherein the score is determined based on at least the importance of the one or more entities being introduced or removed at each of the one or more possible logical breaks, a distance between the one or more entities being introduced or removed at each of the one or more possible logical breaks, and a location of each of the one or more possible logical breaks within the user range; and
   determining, by the one or more computer processors, based on the score for each of the one or more logical breaks, a first logical break of the one or more possible logical breaks within the determined user range for the current reading session.

2. The method of claim 1, further comprising:
   modifying, by the one or more computer processors, the digital text prior to the first logical break.

3. The method of claim 2, wherein modifying the digital text prior to the first logical break further comprises condensing a portion of the digital text remaining prior to the determined first logical break.

4. The method of claim 1, further comprising:
   creating, by the one or more computer processors, a timeline of the digital text, wherein the timeline includes at least one of: an introduction of an entity and a removal of an entity, and wherein the one or more possible logical breaks are determined based on the timeline of the digital text.

5. The method of claim 4, wherein creating the timeline of the digital text further comprises:
   determining, by the one or more computer processors, an importance of an entity is below a predetermined threshold; and
   removing, by the one or more computer processors, the entity from the timeline.

6. The method of claim 1, wherein determining the one or more possible logical breaks within the user range further comprises:
   determining, by the one or more computer processors, at least one of: one or more locations in the digital text where the one or more entities is introduced and one or more locations in the digital text where the one or more entities is removed.

7. The method of claim 1, where the importance of an entity of the one or more entities being introduced or removed at each of the one or more possible logical breaks is determined based on a number of phrases in which the entity appears in a section of the digital text and whether the entity appears in multiple sections of the digital text.

8. The method of claim 1, further comprising:
   determining, by the one or more computer processors, a second available reading time for the current reading session; and
   determining, by the one or more computer processors, based on the second available reading time, one or more additional possible logical breaks.

9. A computer program product for determining one or more logical breaks in a digital text, the computer program product comprising:
   one or more computer readable storage devices and program instructions stored on the one or more computer readable storage devices, the stored program instructions comprising:
   program instructions to determine a reading speed of a user for a current reading session of a digital text;
   program instructions to determine an available time for the current reading session for the user;
   program instructions to determine based, at least in part, on the reading speed and the available time, a user range in the digital text for the current reading session;
   program instructions to determine one or more possible logical breaks within the user range based on a timeline of the digital text, wherein the timeline includes an importance of one or more entities being introduced or removed;
   program instructions to determine a score for each of the one or more possible logical breaks, wherein the score is determined based on at least the importance of the one or more entities being introduced or removed at each of the one or more possible logical breaks, a distance between the one or more entities being introduced or removed at each of the one or more possible logical breaks, and a location of each of the one or more possible logical breaks within the user range; and program instructions to determine, based on the score for each of the one or more logical breaks, a first logical break of the one or more possible logical breaks within the determined user range for the current reading session.

10. The computer program product of claim 9, further comprising:
program instructions to modify the digital text prior to the first logical break.

11. The computer program product of claim 10, wherein the program instructions to modify the digital text prior to the first logical break further comprise condensing a portion of the digital text remaining prior to the determined first logical break.

12. The computer program product of claim 9, further comprising:
program instructions to create a timeline of the digital text, wherein the timeline includes at least one of: an introduction of an entity and a removal of an entity, and wherein the one or more possible logical breaks are determined based on the timeline of the digital text.

13. The computer program product of claim 12, wherein the program instructions to create a timeline of the digital text further comprise:
program instructions to determine an importance of an entity is below a predetermined threshold; and
program instructions to remove the entity from the timeline.

14. A computer system for determining one or more logical breaks in a digital text, the computer system comprising:
one or more computer processors;
one or more computer readable storage devices;
program instructions stored on the one or more computer readable storage devices for execution by at least one of the one or more computer processors, the stored program instructions comprising:
program instructions to determine a reading speed of a user for a current reading session of a digital text;
program instructions to determine an available time for the current reading session for the user;
program instructions to determine based, at least in part, on the reading speed and the available time, a user range in the digital text for the current reading session;
program instructions to determine one or more possible logical breaks within the user range based on a timeline of the digital text, wherein the timeline includes an importance of one or more entities being introduced or removed;
program instructions to determine a score for each of the one or more possible logical breaks, wherein the score is determined based on at least the importance of the one or more entities being introduced or removed at each of the one or more possible logical breaks, a distance between the one or more entities being introduced or removed at each of the one or more possible logical breaks, and a location of each of the one or more possible logical breaks within the user range; and
program instructions to determine, based on the score for each of the one or more logical breaks, a first logical break of the one or more possible logical breaks within the determined user range for the current reading session.

15. The computer system of claim 14, further comprising:
program instructions to modify the digital text prior to the first logical break.

16. The computer system of claim 15, wherein the program instructions to modify the digital text prior to the first logical break further comprise condensing a portion of the digital text remaining prior to the determined first logical break.

17. The computer system of claim 14, further comprising:
program instructions to create a timeline of the digital text, wherein the timeline includes at least one of: an introduction of an entity and a removal of an entity, and wherein the one or more possible logical breaks are determined based on the timeline of the digital text.

18. The computer system of claim 17, wherein the program instructions to create a timeline of the digital text further comprise:
program instructions to determine an importance of an entity is below a predetermined threshold; and
program instructions to remove the entity from the timeline.

* * * * *